United States Patent
Park et al.

(10) Patent No.: US 12,424,122 B2
(45) Date of Patent: Sep. 23, 2025

(54) DEEP LEARNING-BASED PEDAGOGICAL WORD RECOMMENDATION SYSTEM FOR PREDICTING AND IMPROVING VOCABULARY SKILLS OF FOREIGN LANGUAGE LEARNERS

(71) Applicant: RIIID INC., Seoul (KR)

(72) Inventors: June Young Park, Yongin (KR); Jae Min Shin, Seoul (KR)

(73) Assignee: RIIID INC., Seoul (KR)

( * ) Notice: Subject to any disclaimer, the term of this patent is extended or adjusted under 35 U.S.C. 154(b) by 746 days.

(21) Appl. No.: 17/845,351

(22) Filed: Jun. 21, 2022

(65) Prior Publication Data
US 2022/0406217 A1    Dec. 22, 2022

(30) Foreign Application Priority Data
Jun. 21, 2021    (KR) .................. 10-2021-0079781

(51) Int. Cl.
G09B 19/06    (2006.01)
G06F 18/22    (2023.01)

(52) U.S. Cl.
CPC ............. *G09B 19/06* (2013.01); *G06F 18/22* (2023.01)

(58) Field of Classification Search
CPC ................................ G09B 19/06; G06F 18/22
See application file for complete search history.

(56) References Cited

FOREIGN PATENT DOCUMENTS

KR    10-1797365 B1    11/2017
KR    10-2213476 B1    2/2021

OTHER PUBLICATIONS

Jonathan Hui, NLP—Word Embedding & GloVe, Oct. 21, 2019.*
Yating Zhang, Towards Understanding Word Embeddings: Automatically Explaining Similarity of Terms, 2016.*

* cited by examiner

*Primary Examiner* — Kang Hu
(74) *Attorney, Agent, or Firm* — Sughrue Mion, PLLC

(57) ABSTRACT

A method in which a server recommends a word to a user according to the present specification, includes receiving training data from a network and training an AI model by using the training data; inputting (1) a user vector and (2) a word vector to the AI model, and generating (1) a user embedding vector and (2) a word embedding vector for determining whether the user knows a word related to the word vector, on the basis of the trained AI model; inputting (1) the user embedding vector and (2) the word embedding vector to a function for determining whether the user knows a word related to the word vector; and outputting a result value for predicting whether the user knows a word related to the word vector from the function.

8 Claims, 4 Drawing Sheets

DEEP LEARNING-BASED PEDAGOGICAL WORD RECOMMENDATION SYSTEM FOR PREDICTING AND IMPROVING VOCABULARY SKILLS OF FOREIGN LANGUAGE LEARNERS

TECHNICAL FIELD

The present specification relates to a method of recommending a word for improving vocabulary skills of foreign language learners through deep learning, and an apparatus for the method.

BACKGROUND ART

In studying a second foreign language, in order to learn a word or memorize a word, the most important point for a user is to find a way for the user to memorize a vocabulary effectively.

For example, the problems students often face may be the followings. First, a user may need to manually enter unknown words into an app (or write on paper) to make and use flashcards. Second, it is difficult to implement a system that automatically recommends an interface using a word or algorithm that the user does not know.

However, in the existing academia or industry, there has not been much effort to alleviate such burden of users by using artificial intelligence (AI).

SUMMARY OF INVENTION

Technical Problem

An object of the present specification is to provide a method for increasing efficiency and effectiveness of word memorization of foreign language learners.

In addition, an object of the present specification is to provide a method for recommending an accurate word to foreign language learners by a trained AI model through knowledge tracking of foreign language learners.

The technical problems to be achieved by the present specification are not limited to the technical problems mentioned above, and other technical problems not mentioned may be clear to those of ordinary skill in the art to which the present specification belongs from the detailed description of the following specification.

Solution to Problem

According to an aspect of the present specification, there is provided a method in which a server recommends a word to a user, including: a step of receiving training data from a network and training an AI model by using the training data; a step of inputting (1) a user vector and (2) a word vector to the AI model and generating (1) a user embedding vector and (2) a word embedding vector for determining whether the user knows a word related to the word vector, on the basis of the trained AI model; a step of inputting (1) the user embedding vector and (2) the word embedding vector to a function for determining whether the user knows a word related to the word vector; and a step of outputting a result value for predicting whether the user knows a word related to the word vector from the function.

In addition, the AI model may include (1) a user embedding model for generating the user embedding vector, and (2) a word embedding model for generating the word embedding vector.

In addition, (1) the user embedding model and (2) the word embedding model may be optimized to encode (1) the user vector and (2) the word vector closest to each other.

In addition, the function may output the result value on the basis of proximity between (1) the user embedding vector and (2) the word embedding vector.

In addition, the function may output the result value on the basis of the following equation:

$\hat{y}_{ij} = \sigma(f(u, v))$, and the u, the v, and the $\hat{y}_{ij}$ may denote the user vector, the word vector, and the result value, respectively.

In addition, recommended word information may be transmitted to a terminal of the user on the basis of the result value.

In addition, the training data may include information of a word added to a vocabulary list for learning by one or more users.

According to another aspect of the present specification, there is provided a server which recommends a word to a user, including: a communication module; a memory; and a processor, wherein the processor receives training data from a network through the communication module, trains an AI model by using the training data, inputs (1) a user vector and (2) a word vector to the AI model, generates (1) a user embedding vector and (2) a word embedding vector for determining whether the user knows a word related to the word vector, on the basis of the trained AI model, inputs (1) the user embedding vector and (2) the word embedding vector to a function for determining whether the user knows a word related to the word vector, and outputs a result value for predicting whether the user knows a word related to the word vector from the function.

Advantageous Effects of Invention

According to the embodiment of the present specification, it is possible to increase efficiency and effectiveness of word memorization of foreign language learners.

In addition, according to the embodiment of the present specification, it is possible to recommend an accurate word to foreign language learners by a trained AI model through knowledge tracking of foreign language learners.

The effects obtainable in the present specification are not limited to the above-mentioned effects, and other effects not mentioned will be clearly understood by those of ordinary skill in the art to which the present specification belongs from the description below.

Figure 1:
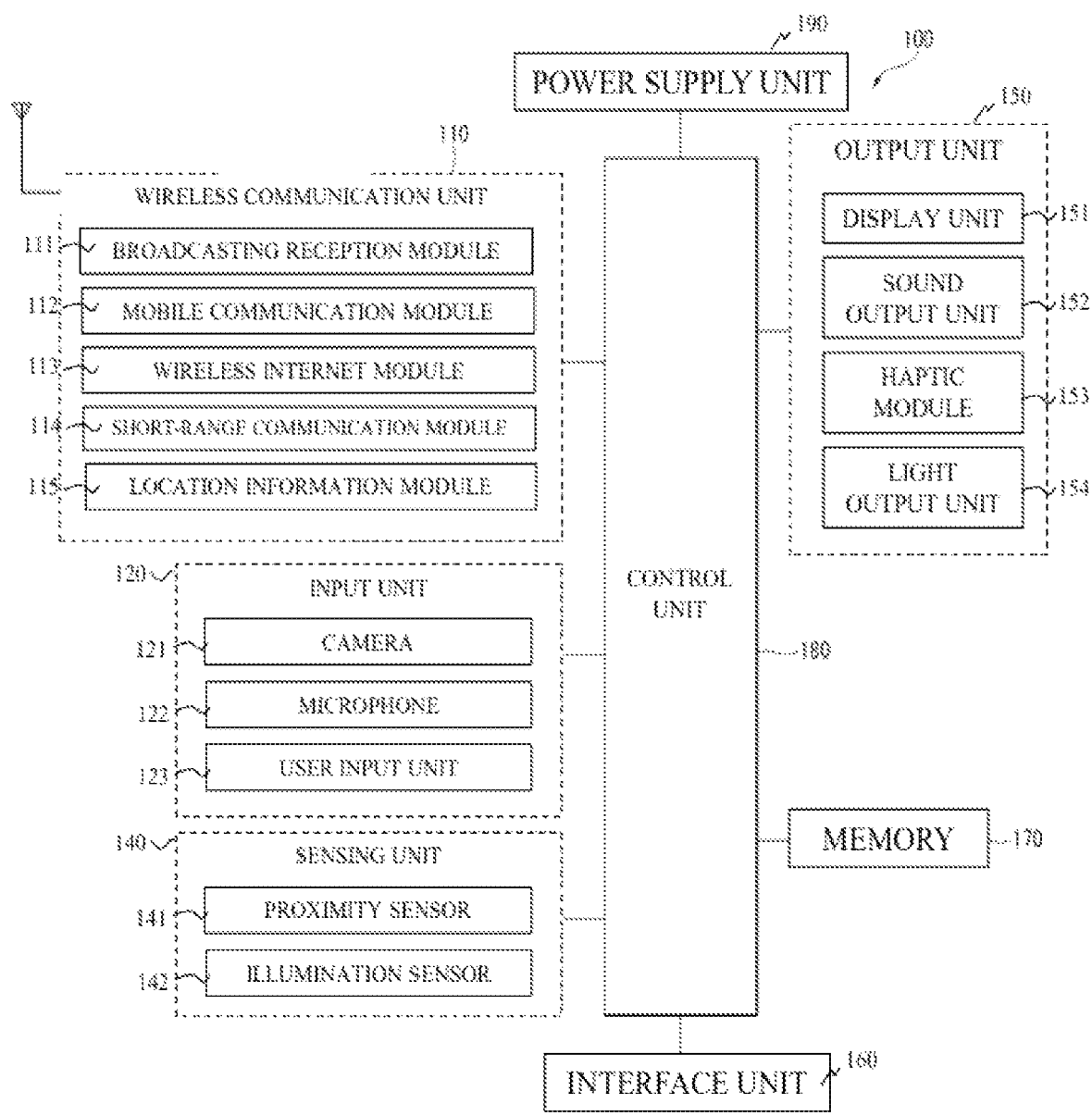
FIG. 1 is a block diagram illustrating an electronic apparatus related to the present specification.

The accompanying drawings, which are included as a part of the detailed description to help the understanding of the present specification, provide embodiments of the present specification, and together with the detailed description, explain the technical features of the present specification.

DESCRIPTION OF EMBODIMENTS

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical idea disclosed in the present specification is not limited by the accompanying drawings, and should be understood to include all changes, equivalents, or substitutes included in the spirit and scope of the present specification.

Terms including an ordinal number, such as first, second, etc., may be used to describe various components, but the components are not limited by the terms. The above terms are used only for the purpose of distinguishing one component from another.

When a certain component is referred to as being "connected" or "linked" to another component, it may be directly connected or linked to the other component, but it should be understood that other components may exist in between. On the other hand, when it is mentioned that a certain component is "directly connected" or "directly linked" to another component, it should be understood that no other component exists in between.

The singular expression includes the plural expression unless the context clearly dictates otherwise.

In the present application, terms such as "include" or "have" are intended to designate that the features, numbers, steps, operations, components, parts, or combinations thereof described in the specification exist, and it should be understood that the possibility of presence or addition of one or more other features, numbers, steps, operations, components, parts, or combinations thereof is not excluded.

FIG. 1 is a block diagram illustrating an electronic apparatus according to the present specification.

The electronic apparatus 100 may include a wireless communication unit 110, an input unit 120, a sensing unit 140, an output unit 150, an interface unit 160, a memory 170, a control unit 180, a power supply unit 190, and the like. The components illustrated in FIG. 1 are not essential in implementing the electronic apparatus, and the electronic apparatus described in the present specification may have more or fewer components than the components listed above.

More specifically, the wireless communication unit 110 of the components may include one or more modules which enable wireless communication between the electronic apparatus 100 and a wireless communication system, between the electronic apparatus 100 and another electronic apparatus 100, or between the electronic apparatus 100 and an external server. In addition, the wireless communication unit 110 may include one or more modules which connect the electronic apparatus 100 to one or more networks.

Such a wireless communication unit 110 may include at least one of a broadcasting reception module 111, a mobile communication module 112, a wireless internet module 113, a short-range communication module 114, and a location information module 115.

The input unit 120 may include a camera 121 or an image input unit for inputting an image signal, a microphone 122 or an audio input unit for inputting an audio signal, and a user input unit 123 (e.g., touch key, push key (mechanical key), etc.) for receiving information from a user. Voice data or image data collected by the input unit 120 may be analyzed and processed by a control command of a user.

The sensing unit 140 may include one or more sensors for sensing at least one of information in the electronic apparatus, surrounding environment information around the electronic apparatus, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared sensor (IR sensor), a finger scan sensor, an ultrasonic sensor, an optical sensor (e.g., camera 121), a microphone 122, a battery gauge, an environment sensor (e.g., barometer, hygrometer, thermometer, radiation detection sensor, heat detection sensor, and gas detection sensor), and a chemical sensor (e.g., electronic nose, healthcare sensor, and biometric sensor). Meanwhile, the electronic apparatus disclosed in the present specification may utilize combination of information sensed by at least two sensors of such sensors.

The output unit 150 is to generate an output related to sight, hearing, touch, or the like, and may include at least one of a display unit 151, a sound output unit 152, a haptic module 153, and a light output unit 154. The display unit 151 has an inter-layer structure with a touch sensor or is formed integrally, thereby implementing a touch screen. Such a touch screen may serve as a user input unit 123 providing an input interface between the electronic apparatus 100 and a user, and may provide an output interface between the electronic apparatus 100 and the user.

The interface unit 160 serves as a passage with various kinds of external apparatus connected to the electronic apparatus 100. Such an interface unit 160 may include at least one of a wired/wireless headset port, an external charger port, a wired/wireless data port, a memory card port, a port connecting a device provided with an identification module, an audio I/O (Input/Output) port, a video I/O (Input/Output) port, and an earphone port. The electronic apparatus 100 may perform a proper control related to a connected external apparatus in response to connecting an external apparatus to the interface unit 160.

In addition, the memory 170 stores data supporting various functions of the electronic apparatus 100. The memory 170 may store a number of programs (application program or application) running in the electronic apparatus 100, data for operation of the electronic apparatus 100, and commands. At least a part of such application programs may be downloaded from an external server through wireless communication. In addition, at least a part of such application programs may exist on the electronic apparatus 100 from the time of shipment for basic functions (e.g., call receiving and sending functions, and message receiving and sending functions) of the electronic apparatus 100. Meanwhile, the application programs may be stored in the memory 170, installed on the electronic apparatus 100, and driven to perform operations (or functions) of the electronic apparatus by the control unit 180.

In addition to the operations related to the application programs, the control unit 180 generally controls overall operations of the electronic apparatus 100. The control unit 180 may provide or process appropriate information or functions to a user by processing signals, data, information, and the like input or output through the components described above or running the application programs stored in the memory 170.

In addition, the control unit 180 may control at least a part of the components described with reference to FIG. 1 to run the application programs stored in the memory 170. Furthermore, in order to run the application programs, the control unit 180 may operate at least two components included in the electronic apparatus 100 in combination with each other.

The power supply unit 190 receives external power and internal power, and supplies power to each component included in the electronic apparatus 100 under the control of the control unit 180. Such a power supply unit 190 may include a battery, and the battery may be a built-in battery or a replaceable battery.

At least a part of the components may be operated cooperatively with each other to implement an operation, control, or control method of the electronic apparatus according to various embodiments described hereinafter. In addition, the operation, control, or control method of the electronic apparatus may be implemented on the electronic apparatus by running at least one application program stored in the memory 170.

In the present specification, the electronic apparatus 100 may be collectively referred to as a terminal.

Figure 2:
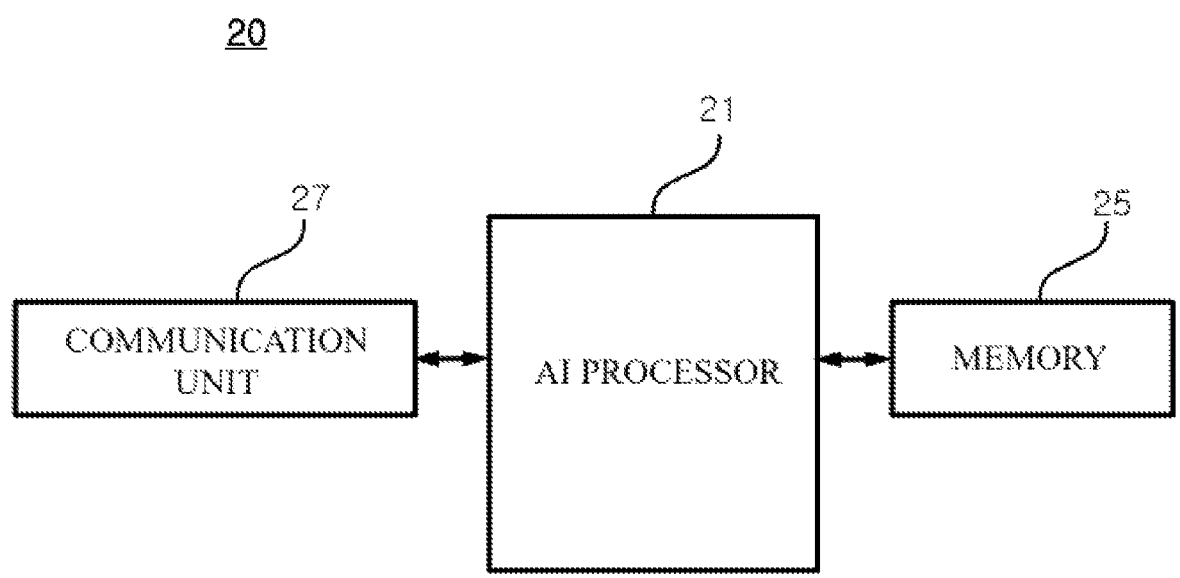
FIG. 2 is a block diagram illustrating an AI device according to an embodiment of the present specification.

FIG. 2 is a block diagram illustrating an AI device according to an embodiment of the present specification.

The AI device 20 may include an electronic apparatus including an AI module capable of AI processing or a server including the AI module. In addition, the AI device 20 may be included as at least a part of the composition of the electronic apparatus 100 illustrated in FIG. 1, and perform at least a part of the AI processing together.

The AI device 20 may include an AI processor 21, a memory 25, and/or a communication unit 27.

The AI device 20 may be implemented by various electronic device such as a server, a desktop PC, a laptop PC, and a tablet PC, as a computing device capable of learning a neural network.

The AI processor 21 may learn an AI model by using a program stored in the memory 25. Particularly, the AI processor 21 may learn the AI model to recognize data for word learning.

Meanwhile, the AI processor 21 performing the functions described above may be a general purpose processor (e.g., CPU), but may be an AI dedicated processor (e.g., GPU) for artificial intelligence learning.

The memory 25 may store various kinds of programs and data necessary for operation of the AI device 20. The memory 25 may be implemented by a non-volatile memory, a volatile memory, a flash memory, a hard disk drive (HDD), a solid state drive (SSD), and the like. The memory 25 may be accessed by the AI processor 21, and the AI processor 21 may perform reading, recording, modifying, deleting, updating, and the like of data. In addition, the memory 25 may store a neural network model (e.g., deep learning model) generated through a learning algorithm for data classification/recognition according to an embodiment of the present specification.

Meanwhile, the AI processor 21 may include a data learning unit which learns a neural network for data classification/recognition. For example, the data learning unit may acquire training data to be used for learning, and apply the acquired training data to a deep learning model, thereby training the deep learning model.

The communication unit 27 may transmit an AI processing result of the AI processor 21 to an external electronic apparatus.

Herein, the external electronic apparatus may include another terminal and server.

Meanwhile, the AI device 20 illustrated in FIG. 2 has been functionally divided into the AI processor 21, the memory 25, the communication unit 27, and the like, but the components described above may be integrated into one module and may be referred to as an AI module.

Memorizing words is one of the most difficult parts for a user in learning a second foreign language. The present specification proposes a deep learning-based recommendation system that allows a user to learn words more conveniently.

Figure 3:
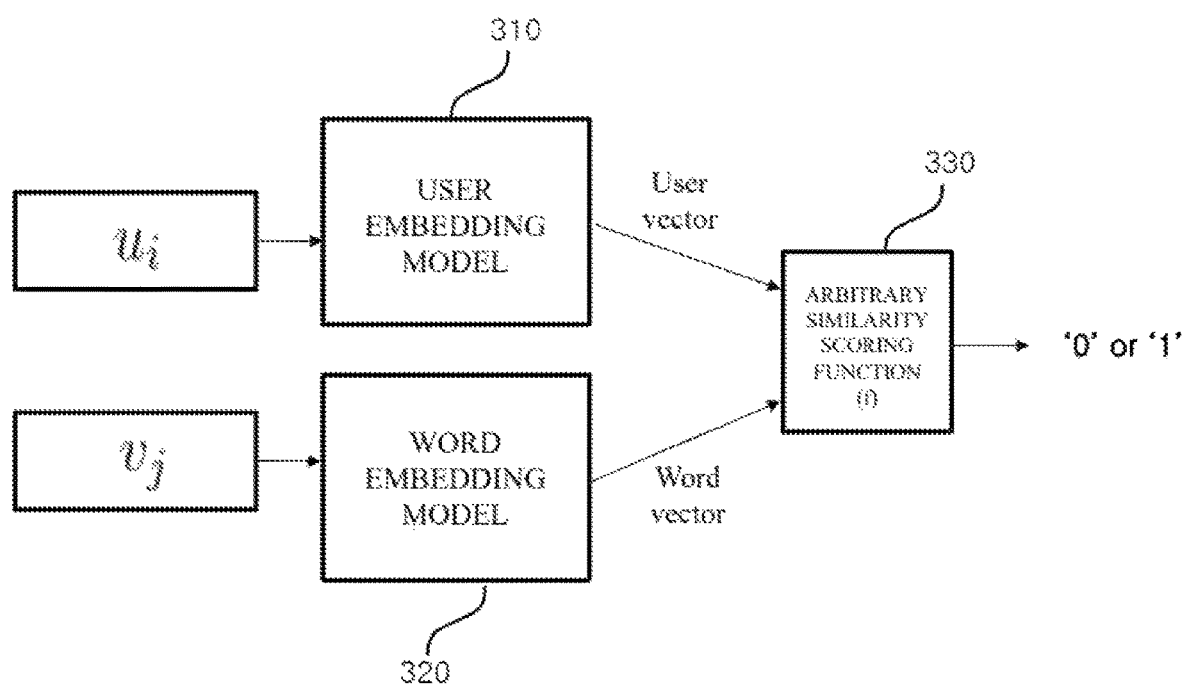
FIG. 3 is a diagram illustrating an example of a word recommendation algorithm according to the present specification.

FIG. 3 is a diagram illustrating an example of a word recommendation algorithm according to the present specification.

Referring to FIG. 3, for example, a server may collect data from an intelligent tutoring system (ITS) provided in real time to 10,000 or more English L2 learners preparing TOEIC. More specifically, a user of a web and/or mobile app provided by the intelligent tutoring system may study TOEIC reading and/or listening questions. For each question answered, the user may review the entire passage (or script of listening question), mark unknown words, and add them to a vocabulary list.

In this case, the server may assume that the words added to the vocabulary list by the user are the words unknown to the user, and train the mounted AI model by using data of words which the user does not know for each user.

The following Table 1 is an example of AI model training data according to the present specification.

TABLE 1

| Index | User_id | Word | Marked |
|---|---|---|---|
| 1 | 1 | Throne | 1 |
| 2 | 1 | Abdicate | 1 |
| 3 | 1 | Monarch | 0 |
| 4 | 2 | Entrepreneur | 1 |
| 5 | 3 | kingdom | 0 |
| ... | ... | ... | ... |

Referring to Table 1, a server may train an AI model by using information of words added to a vocabulary list by a user for each user. For example, the server may generate training data in which words the user knows or words the user does not know are marked (e.g., '1' is an unknown word, '0' is a known word), and the AI model may learn known words and unknown words for each user by using the generated training data.

The AI model may include a collaborative filtering model for predicting words which the user does not know.

For example, the user may input user $u_i$ (e.g., user's ID and user's history information (e.g., whether a user added a word to a vocabulary list and information that the user succeeded in knowing a word included in the vocabulary list)), word $v_j$ (e.g., word information), and label $y_{ij}$ related thereto, to the collaborative filtering model. In order to acquire an output predicted value $\hat{y}_{ij}$, a framework of the collaborative filtering model may include a user embedding model 310, a word embedding model (e.g., word2vec) 320, and an arbitrary similarity scoring function (f) 330 using user (U) and word (V) embedding vectors.

Such a user embedding model and word embedding model may be replaced by an AI model (e.g., AI model based on deep learning model).

The following equation 1 is an example of the arbitrary similarity scoring function 330 according to the present specification.

[Equation 1]

$$u = U(u_i) v = V(v_j) \quad (1)$$

$$\hat{y}_{ij} = \sigma(f(u,v)) \quad (2)$$

Referring to Equation 1, herein, "similarity" of the arbitrary similarity scoring function 330 may mean proximity of a user embedding vector and a word embedding vector (u, v) in a user-word joint embedding space. Accordingly, the above-described embedding models (U and V) may be optimized to encode user and word vectors closest to each other. For example, the embedding model may consider a vector similar to a word capable of giving a user the most educational value in consideration of a knowledge status (e.g., word acquisition status) of the user.

Referring to Equation 1 again, U and V are trainable parameters of user and word embedding models, respectively, and a trained word embedding model may be initialized to V.

In addition, $\sigma(\bullet)$ may be a sigmoid function. A training goal of the collaborative filtering model is to minimize binary cross entropies of $y_{ij}$ and $\hat{y}_{ij}$. In the existing model (e.g., MF, Matrix Factorization), f is a simple dot product operation. Accordingly, (2) of Equation 1 may be $\sigma(u \cdot v)$. However, in a later model (e.g., NCF, Neural Collaborative Filtering), f may be a multi-layer perceptron network using u and v as input values (concatenation).

Referring to FIG. 3 again, the user embedding model 310 and the word embedding model 320 may generate appropriate user vector and word vector. The generated user vector and the word vector may be input to the function f capable of predicting whether a user i knows a word j. For example, when it is predicted that the user i knows the word j, the function f may output a value of 0, and when it is predicted that the user i does not know the word j, the function f may output a value of 1.

The above-described operation of the server may be performed in a user terminal through a separate application installed in the user terminal.

Through this, the method proposed in the present specification may dramatically increase both of efficiency and effectiveness of word memorization, and the server may increase accuracy of a word recommended to a user by using the trained AI model through knowledge tracking of the user.

Figure 4:
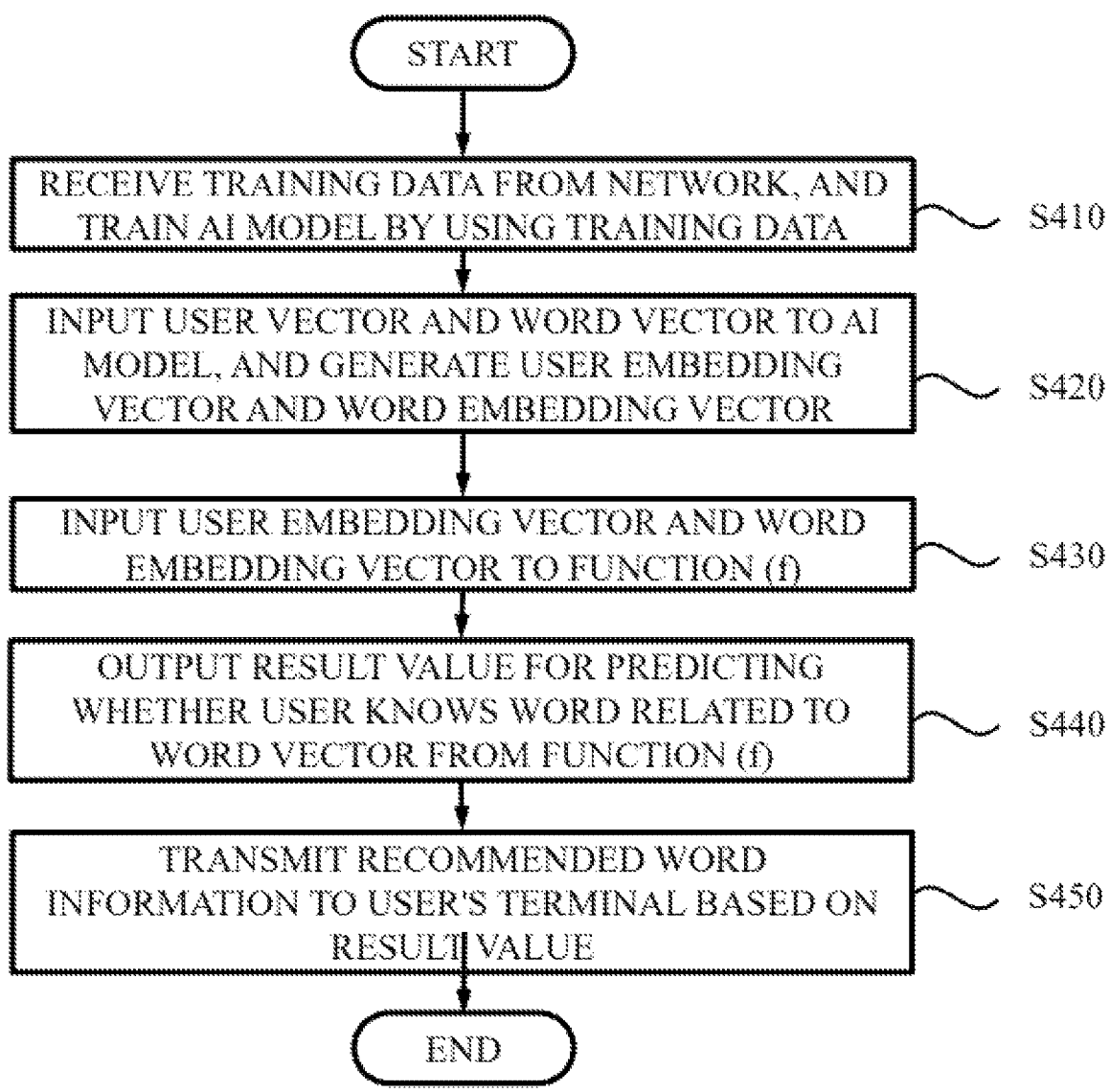
FIG. 4 is a diagram illustrating an embodiment of the present specification.

FIG. 4 is a diagram illustrating an embodiment according to the present specification.

Referring to FIG. 4, a server receives training data from a network, and trains an AI model by using the training data (S410). For example, the network may include the above-described ITS, and the training data may include information of words added to a vocabulary list for learning by one or more users. More specifically, the training data may include data about an index, a user identifier, a word, and marking. The AI model may learn data of words which users do not know for each user.

On the basis of the trained AI model, the server inputs (1) a user vector and (2) a word vector to the AI model, and generates (1) a user embedding vector and (2) a word embedding vector for determining whether the user knows a word related to the word vector (S420). For example, the AI model may include (1) a user embedding model for generating a user embedding vector and (2) a word embedding model for generating a word embedding vector. In addition, the server may optimize (1) the user embedding model and (2) the word embedding model to encode (1) the user vector and (2) the word vector closest to each other.

The server inputs (1) the user embedding vector and (2) the word embedding vector to a function for determining whether the user knows a word related to the word vector (S430). For example, a function f may output the result value on the basis of proximity of (1) the user embedding vector and (2) the word embedding vector, and may output the result value on the basis of Equation 1 described above. More specifically, in Equation 1, u, v, and $\hat{y}_{ij}$ may denote the user vector, the word vector, and the result value, respectively.

The server outputs a result value for predicting whether the user knows a word related to the word vector from the function (S440). For example, the AI model may include a user embedding model and a word embedding model. More specifically, a new user vector may be input to a user embedding model, and the user embedding model may output a user embedding vector to be input to the arbitrary similarity scoring function. In addition, a word vector may be input to a word embedding model, and the word embedding model may output a word embedding vector to be input to the arbitrary similarity scoring function.

For example, when the new user knows the word, the arbitrary similarity scoring function outputs '0', and when the new user does not know the word, the arbitrary similarity scoring function outputs '1', thereby determining whether the new user knows the word.

The server may transmit recommended word information to a user terminal on the basis of a result value (S450). For example, the recommended word information may include a word predicted as a word which a user does not know.

The above-described present specification may be implemented as a computer-readable code on a program-recorded medium. The computer-readable medium includes all kinds of recording devices which store data readable by a computer system. Examples of the computer-readable medium are an HDD (Hard Disk Drive), an SSD (Solid State Disk), an SDD (Silicon Disk Drive), a ROM, a RAM, a CD-ROM, a magnetic tape, a floppy disk, an optical data storage device, and the like, and also include that implemented in a form of carrier wave (e.g., transmission through internet). Accordingly, the above detailed description should not be construed as restrictive in all respects and should be considered as exemplary. The scope of the present specification should be determined by a reasonable interpretation of the appended claims, and all modifications within the equivalent scope of the present specification are included in the scope of the present specification.

In addition, although the above description has been focused on services and embodiments, this is merely an example and does not limit the present specification, and those of ordinary skill in the art can know that various modifications and application not exemplified in the above description are possible in the scope not depart from the essential characteristics of the present service and embodiments. For example, each component specifically represented in the embodiments may be modified and implemented. In addition, differences related to such modifications and applications should be construed as being included in the scope of the present specification defined in the appended claims.

The invention claimed is:

1. A word recommendation method in which a server recommends a word to a user, comprising:
   a step of receiving training data from a network and training an AI model by using the training data;
   a step of inputting (1) a user vector and (2) a word vector to the AI model, and generating (1) a user embedding vector and (2) a word embedding vector for determining whether the user knows a word related to the word vector, on the basis of the trained AI model;
   a step of inputting (1) the user embedding vector and (2) the word embedding vector to a function for determining whether the user knows a word related to the word vector; and
   a step of outputting a result value for predicting whether the user knows a word related to the word vector from the function,
   wherein the AI model includes (1) the user embedding model for generating the user embedding vector, (2) the word embedding model for generating the word embedding vector of a word related to word information, and (3) the function, and
   wherein the function is an arbitrary similarity scoring function for determining similarity between word embedding vectors acquired from the word embedding model.

2. The word recommendation method according to claim 1, wherein (1) the user embedding model and (2) the word embedding model are optimized to encode (1) the user vector and (2) the word vector closest to each other.

3. The word recommendation method according to claim 2, wherein the function outputs the result value on the basis of proximity between (1) the user embedding vector and (2) the word embedding vector.

4. The word recommendation method according to claim 3, wherein the function outputs the result value on the basis of the following equation:

$$\hat{y}_{ij} = \sigma(f(u,v)),$$

wherein the u, the v, and the $\hat{y}_{ij}$ denote the user vector, the word vector, and the result value, respectively.

5. The word recommendation method according to claim 1, further comprising a step of transmitting recommended word information to a terminal of the user on the basis of the result value.

6. The word recommendation method according to claim 5, wherein the training data includes information of a word added to a vocabulary list for learning by one or more users.

7. A server which recommends a word to a user, comprising:
   a communication module;
   a memory; and
   a processor,
   wherein the processor receives training data from a network through the communication module, trains an AI model by using the training data, inputs (1) a user vector and (2) a word vector to the AI model, generates (1) a user embedding vector and (2) a word embedding vector for determining whether the user knows a word related to the word vector, on the basis of the trained AI model, inputs (1) the user embedding vector and (2) the word embedding vector to a function for determining whether the user knows a word related to the word vector, and outputs a result value for predicting whether the user knows a word related to the word vector from the function,
   wherein the AI model includes (1) the user embedding model for generating the user embedding vector, (2) the word embedding model for generating the word embedding vector of a word related to word information, and (3) the function, and
   wherein the function is an arbitrary similarity scoring function for determining similarity between word embedding vectors acquired from the word embedding model.

8. The server according to claim 7, wherein the processor transmits recommended word information to a terminal of the user on the basis of the result value through the communication module.

* * * * *